United States Patent
Berzosa et al.

(10) Patent No.: US 7,376,737 B2
(45) Date of Patent: May 20, 2008

(54) OPTIMISED RECEIVER-INITIATED SENDING RATE INCREMENT

(75) Inventors: Fernando Berzosa, Darmstadt (DE); Rolf Hakenberg, Darmstadt (DE); Thomas Klinner, Aschaffenburg (DE); Carsten Burmeister, Hamburg (DE)

(73) Assignee: Matsushita Electric Industrial Co., Ltd., Osaka (JP)

(*) Notice: Subject to any disclaimer, the term of this patent is extended or adjusted under 35 U.S.C. 154(b) by 849 days.

(21) Appl. No.: 10/437,464

(22) Filed: May 14, 2003

(65) Prior Publication Data

US 2004/0003105 A1    Jan. 1, 2004

(30) Foreign Application Priority Data

Jun. 18, 2002   (EP) .................................. 02013310

(51) Int. Cl.
*G06F 15/173* (2006.01)

(52) U.S. Cl. .................. 709/225; 709/234; 709/235

(58) Field of Classification Search .............. 709/235, 709/225, 234
See application file for complete search history.

(56) References Cited

U.S. PATENT DOCUMENTS

| 5,675,742 A | 10/1997 | Jain et al. | |
| 6,289,224 B1* | 9/2001 | Boxall et al. | ................ 455/517 |
| 6,944,148 B1* | 9/2005 | Gehring et al. | ............. 370/347 |

FOREIGN PATENT DOCUMENTS

| EP | 0955749 | | 11/1999 | |
| WO | WO 99/04536 | * | 2/1999 | ................ 455/517 |
| WO | 0233909 | | 4/2002 | |
| WO | WO 02/33909 A1 | * | 4/2002 | ................ 455/517 |

OTHER PUBLICATIONS

A. Koike; "Active TCP Control By A Network", 1999 IEEE Global Telecommunications Conference. GlobeCom '99. Seamless Interconnection for Universal Services. Rio De Janeiro, Brazil, Dec. 5-9, 1999, IEEE Global Telecommunications Conference, New York, NY: IEEE, US, vol. 3, Dec. 5, 1999, pp. 1921-1925, XP001003933 ISBN: 0-7803-5797-3.

L. Kalampoukas, et al.; "Explicit Window Adaptation: A Method to Enhance TCP Performance", Infocom '98. Seventeenth Annual Joint Conference of the IEEE Computer and Communications Societies. Proceedings. IEEE San Francisco, CA, Mar. 29-Apr. 2, 1998, New York, NY, USA, IEEE, US Mar. 29, 1998, pp. 242-251, XP010270298 ISBN: 0-7803-4383-2.

(Continued)

*Primary Examiner*—William Vaughn
*Assistant Examiner*—Thanh T. Nguyen
(74) *Attorney, Agent, or Firm*—Dickinson Wright, PLLC

(57) ABSTRACT

A method of incrementing a receiver-initiated sending rate of data packets transmitted from a sender over a network receiver using Transport Control Protocol (TCP) comprising the step of sending an acknowledgement for received data packets from the receiver to the sender, wherein said acknowledgement contains an advertised window indicating the allowed sending bit rate and the step of increasing the advertised window by a maximum of one segment size per acknowledgement.

4 Claims, 1 Drawing Sheet

OTHER PUBLICATIONS

J. W. Lee, et al.; "A study of Rate-Based Credit Flow Control Mechanism Between IP Network and ATM Network", Proceedings of the IEEE Conference 2000 on High Performance Switching and Routing. Heidelberg, Germany, Jun. 26-29, 2000, Proceedings of the IEEE Conference on High Performance Switching and Routing, New York, NY: IEEE, US, Jun. 26, 2000, pp. 205-213, XP00105704 ISBN: 0-7803-5884-8.

Korean Office Action dated Jun. 24, 2005 with English translation.

* cited by examiner

OPTIMISED RECEIVER-INITIATED SENDING RATE INCREMENT

FIELD OF THE INVENTION

This invention relates to packet data transmissions, in particular transmission of data using the Transmission Control Protocol (TCP) over Internet Protocol (IP) networks. TCP provides stability of networks by its integrated congestion and flow control mechanisms. Further, information on TCP and IP networks are, for instance, available from U.S. Pat. No. 6,298,041 B1.

BACKGROUND ART

While the TCP sending rate is normally controlled by the sender, there are scenarios and environments, where the receiver has some knowledge of the used links and bit rates, which make it worthwhile to let the receiver control the data transmission rate of the sender to some extent. In order to apply this mechanism, the receiver should have knowledge of the Round Trip Time (RTT) value to control or limit the sender's bit rate. As a result, the sender would not have to probe for the available bit rate by itself, which normally comes to the expense of packet losses and is less accurate than the receiver's information.

The sending bit rate in the TCP sender is controlled by a sliding window called congestion window. The sender sends data and receives cumulative acknowledgements. Outstanding data is the data that the sender has already sent, but has not received acknowledgements for it. The sender is allowed to have the amount of outstanding data equal to the current value of the congestion window. Because the data is usually acknowledged one RTT after it was send, the allowed sending bit rate, B_send can be calculated from the RTT and the congestion window size, cwnd, as: B_send=cwnd/RTT An example of these values could be RTT=100 ms and B_send=64 Kbit/s.

The congestion window at the server is dynamically adjusted according to gathered network information, e.g. in cases of packet losses, the TCP sender would assume congestion in the network and deflate the window. In cases of no packet losses, the window is slightly and regularly increased. However, the window which TCP uses to control the sending of data packets, is the minimum of the congestion window and another window-size signalled by the receiver called the advertised window, awnd. This is usually used for the flow control features of TCP, i.e. to ensure that a fast TCP sender does not send more data than the receiver can consume.

In conclusion, the receiver can limit the upper sending rate of the sender of a TCP connection, by using the integrated flow control and sending an advertised window with the value calculated from RTT and maximum sending bit rate. In other words, the receiver can dictate a maximum sending bit rate to the server. When increasing this maximum bit rate, the receiver should foresee the sender's behavior in order not to increase the rate too fast, which would initiate a burst of data packets transmitted at the TCP sender that might lead to a buffer overflow on the route.

On the other hand, if the receiver increases the advertised window too slowly, the sender will increase the sending rate likewise slowly and thus will underutilize the link capacity.

Consequently, what is needed is an optimised way of increasing the advertised window resulting in an optimised increase of the sending rate at the TCP sender.

SUMMARY OF THE INVENTION

The present invention provides a method for an optimised receiver-initiated sending rate increment which allows to increase the bit rate as fast as possible to an optimum value and at the same time fully utilizes the available link resources as set forth in claim 1. Preferred embodiments of the method as subject to various dependent claims. The method of present invention increases the advertised window by a maximum of one segment size per acknowledgement. Consequently, the sending bit rate can be adjusted to a new value without initiating a burst of packets which could result in buffer overflow in the transmission route. The receiver is therefore able to increment the bit rate of the sender smoothly but still very fast. Actually, the sender will not send more data than allowed by the advertised window and will not generate more than one packet at a time.

According to a preferred embodiment, the acknowledgements are sent at regular intervals, this additionally smoothens the increment of the bit rate at the sender and uniformly distributes the transmitted packets.

According to a further preferred embodiment, the acknowledgements are stored in a queue before transmission to the sender. As a result, the incoming data packets are not directly acknowledged but instead sent at regular intervals as long as enough acknowledgements are available in the queue.

According to a further advantageous embodiment, when there are less than a predetermined number of acknowledgements in the queue at the next regular time interval, acknowledgements for only a portion of the segment are transmitted to the sender. This has the advantage that in case not enough acknowledgements are available, additional acknowledgements are generated which do not acknowledge a whole segment. However, the sender can use the acknowledgement to adjust the advertised window and correspondingly increase the sending bit rate.

Preferably, the method comprises the step of determining the maximum period for which the transmission of an acknowledgement should be completed. This avoids that the transmission of an acknowledgement is excessively delayed which could lead to a retransmission time out at the TCP sender.

According to a further preferred embodiment of the method, an acknowledgement for the remainder of the segment is sent at the latest when the maximum period for completion of an acknowledgement has lapsed.

BRIEF DESCRIPTION OF THE DRAWING

In the following, the invention will be described in more detail with reference to the accompanying drawing, in which.

DETAILED DESCRIPTION OF THE EMBODIMENTS

Figure 1:
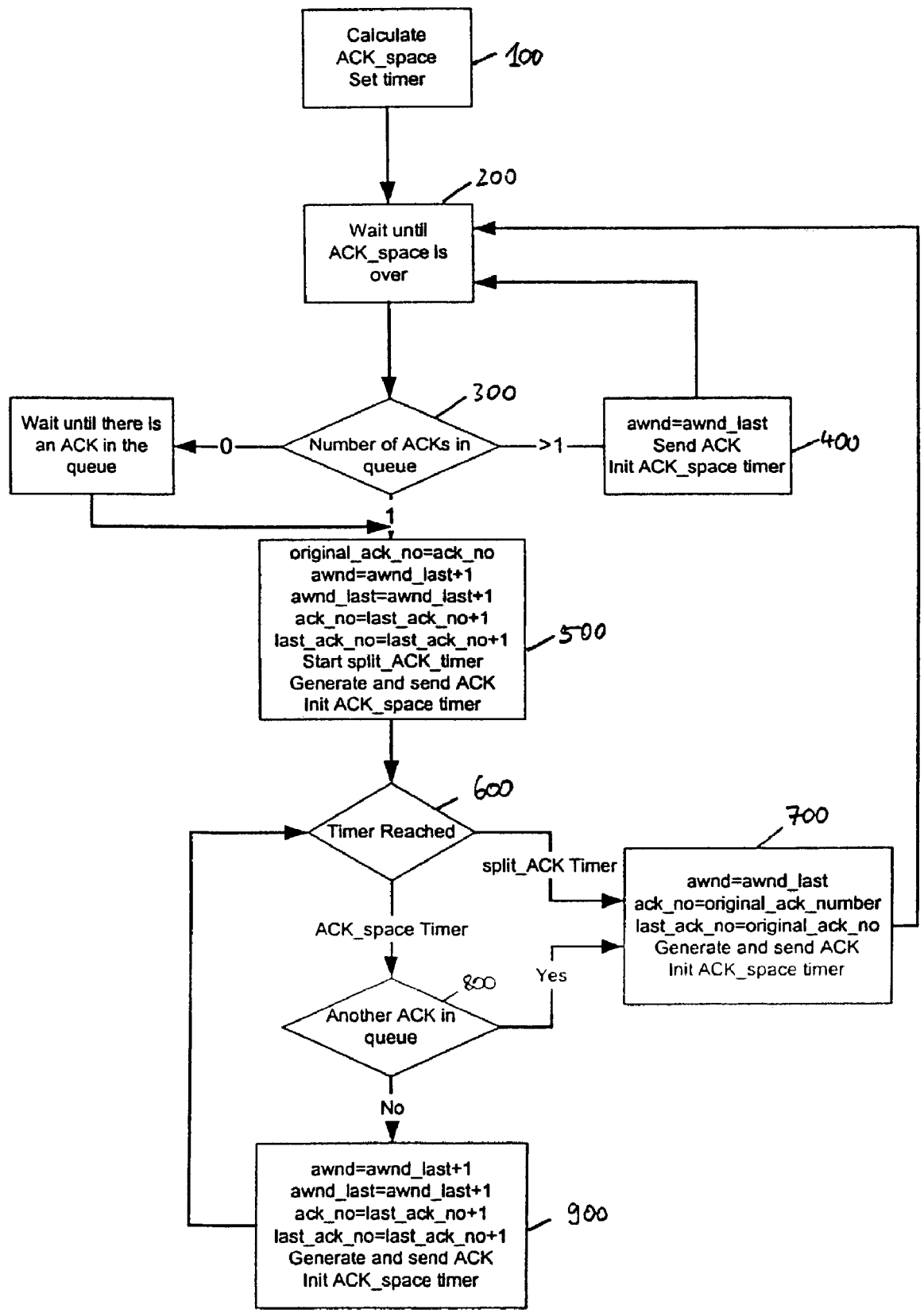
FIG. 1 shows a flow chart illustrating the steps to initiate a new sending bit rate at the server.

For illustrating the invention, in the following a TCP connection between a sender a receiver is assumed, wherein the sender's bit rate B_old is limited by the advertised window awnd according to the following equation:

$$B\_old = awnd/RTT$$

The receiver obtains information that the link capacity available for this connection is increased from B_old to B_new, e.g. because the radio resource control in a mobile network has set up a new radio bearer or another data flow that has shared the link up to now has finished. The receiver calculates a new advertised window according to:

awnd_new=B_new*RTT.

With reference to FIG. 1, a first step 100 is to calculate a new acknowledgement space ACK_space according to ACK_space=MSS/B_new with MSS being the maximum segment size negotiated at the connection set-up or according to ACK_space=RTT/awnd_new where awnd_new is given in numbers of segments. All incoming data packets are not directly acknowledged, but instead the acknowledgements are stored in an ACK-queue. Upon setting the timer in step 100, the receiver waits until the next ACK_space time is over, as illustrated in step 200. Note that, since it is desired that the sender starts transmitting with the new bit rate as soon as possible, the timer in step 100 might be set to an smaller value or even to zero for the first acknowledgement (depending on the time the previous acknowledgement was sent). Consequent acknowledgements will be spaced according to the ACK_space variable in order to avoid packet bursts.

At this time, an acknowledgement should be sent and the flow chart continues with query 300 to see whether more than one acknowledgement is in the ACK-queue. In case there is no acknowledgement in the queue, the algorithm has to pause at this point until a new acknowledgement can be generated.

If more than one acknowledgement is in the ACK-queue, an acknowledgement is sent, the awnd value updated and the ACK_space timer is newly initiated, as indicated in block 400. Under this condition, there are enough acknowledgements in the queue to be used as flow control commands for smoothly increasing the sending bit rate of the server.

On the other hand, if only one acknowledgements is present in the queue, the procedure continues with steps shown in block 500 in the FIGURE. Parameter original_ack_no represents the acknowledgement number of a segment to acknowledge an incoming complete data packet. In other words, the acknowledgement number field of the original acknowledgement packet. Parameter last_ack_no contains the ack_no of the last segment sent. In the steps of block 500, the advertised window awnd and the last advertised awnd_last are respectively incremented by one segment. Further, the acknowledgment number ack_no and the last acknowledgement number last_ack_no are each increased by one byte. Further, there is a need to define a timer split_ack-timer, which defines the maximum period of time for which the transmission of an acknowledgement ACK should be completed. This timer should accordingly be set in order to avoid excessive delay of the transmission of the complete ACK, which would lead to a retransmission time out at the sender.

Subsequently, an acknowledgement is generated. Generate means that some of the header fields of the original acknowledgement should be changed into the ones now calculated. The variables advertised window awnd and acknowledgement number ack_no should be set appropriately in the TCP header. The rest of the variables are only kept locally for the calculations within the algorithm. As a result of these changes the header checksum must also be calculated and set. In the last step, the acknowledgement is sent. It is noted that this acknowledgement is not for a whole segment, but only for a portion thereof, in the present example it is one byte. Hence, this acknowledgement does not allow the sender to send an additional data packet. Nevertheless, it contains (as each acknowledgement) an advertised window (which in this case is increased by one) which triggers the sending of a new data packet. It is however emphasized that the data packet is not triggered by the acknowledgement itself, but due to the increased advertised window. Finally, the last step in block 500 is to initiate or start the ACK-space timer as an acknowledgement has been sent.

The next query 600 in the flowchart determines whether one of the ACK_space timer and the split_ACK timer has been reached. In case the split_ACK timer has been reached, the flow continues with block 700, as the maximum period of time for completion of an acknowledgement for a whole segment has lapsed. Consequently, an acknowledgement with the original acknowledgement number is sent and the parameter last_ack_no and the advertised window value are updated. This acknowledgement now triggers sending of a new data packet, as a whole TCP segment has been acknowledged.

On the other hand, if, in query 600 it is determined that ACK_space timer has been reached, query 800 checks whether another acknowledgement is available in the acknowledgement queue. If so, the procedure continues with steps 700. Otherwise, it reaches block 900. In block 900, the same steps as in block 500 are carried out except that the split_ACK_timer does not need to be started. Hence, in block 900, a further acknowledgement is sent for the next byte of the segment with the corresponding ack_no and awnd value. The flow continues with query 600 as described above.

Finally, it is noted that every time the value of the advertised window becomes modified, it is compared whether the new target value for awnd has been reached. If so, the algorithm finishes as the advertised window has reached its final target value.

By using the above-described algorithm, the receiver ensures that after receiving an acknowledgement, the sender will immediately start sending according to the new data rate, as the increased advertised window value is received at the sender. What is more, the sender will not send more data than allowed by the advertised window and will not generate any packet bursts.

Hence, the algorithm allows the receiver to increment the bit rate of the sender very smoothly and fast without the risk of buffer overflow along the route. At the same time, the available link capacity is efficiently used.

The invention claimed is:

1. A method of incrementing a receiver-initiated sending rate of data packets transmitted from a sender over a network to a receiver using a Transport Control Protocol (TCP), the method comprising the steps of:

sending acknowledgments at regular time intervals for received data packets from the receiver to the sender, said acknowledgments containing an advertised window indicating the allowed sending bit rate;

storing the acknowledgments in a queue before transmission to the sender;

sending an acknowledgment for a portion of a segment to the sender when there are less than a predetermined number of acknowledgments in the queue at the next regular time interval; and increasing the advertised window by a maximum of one segment size per acknowledgment, wherein:

the acknowledgment for the portion of the segment increases its advertised window by one segment, whereas the acknowledgments for the remainder or for whole segments do not increase the advertised window, both acknowledgments allowing the triggering of one next data packet.

2. The method according to claim 1 comprising the further step of determining the maximum period of time for which the transmission of an acknowledgment for a data segment should be completed.

3. The method according to claim 2, further comprising the step of sending an acknowledgment for the remainder of the segment at the latest when the maximum period for completion of an acknowledgment has lapsed.

4. The method according to claim 1, wherein acknowledgments are sent at the time intervals, which are determined on the basis of the maximum segment size and the new sending bit rate.

* * * * *